US012657277B2

(12) United States Patent
Stone et al.

(10) Patent No.: US 12,657,277 B2
(45) Date of Patent: Jun. 16, 2026

(54) VERIFYING A TRUSTED ENTITY'S IDENTIFICATION VIA PROXIMITY-BASED DATA

(71) Applicant: Capital One Services, LLC, McLean, VA (US)

(72) Inventors: Armando Martinez Stone, Arlington, VA (US); Samuel Rapowitz, Roswell, GA (US); Bryant Yee, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 215 days.

(21) Appl. No.: 18/381,814

(22) Filed: Oct. 19, 2023

(65) Prior Publication Data

US 2025/0131079 A1 Apr. 24, 2025

(51) Int. Cl.
| | |
|---|---|
| *G06F 21/40* | (2013.01) |
| *G06F 21/33* | (2013.01) |
| *G06F 21/35* | (2013.01) |

(52) U.S. Cl.
CPC .............. *G06F 21/40* (2013.01); *G06F 21/33* (2013.01); *G06F 21/35* (2013.01)

(58) Field of Classification Search
CPC .......... G06F 21/40; G06F 21/35; G06F 21/33; G06F 2221/2111; G06F 21/31; G06F 2221/2113
See application file for complete search history.

(56) References Cited

U.S. PATENT DOCUMENTS

| | | | |
|---|---|---|---|
| 8,781,956 B2 | 7/2014 | Crooks | |
| 8,856,879 B2 | 10/2014 | Schechter et al. | |
| 10,360,367 B1 * | 7/2019 | Mossoba | G06F 3/0658 |
| 11,122,038 B1 * | 9/2021 | Schuster | H04W 12/06 |
| 11,546,390 B1 | 1/2023 | Boodaei et al. | |

(Continued)

OTHER PUBLICATIONS

F. Zhang et al., "Location-Based Authentication and Authorization Using Smart Phones," 2012 IEEE 11th International Conference on Trust, Security and Privacy in Computing and Communications, Liverpool, UK, 2012, pp. 1285-1292, doi: 10.1109/TrustCom.2012. 198. (Year: 2012).*

(Continued)

*Primary Examiner* — Lizbeth Torres-Diaz
(74) *Attorney, Agent, or Firm* — Banner & Witcoff, Ltd.

(57) ABSTRACT

Methods of verifying a user's identity using trusted members of the user's community are provided. Users may request trusted friends and family members register as vouching users. If a user needs to confirm the user's identity, such as during a multifactor authentication verification or in the event of a forgotten credential, vouching users may be called upon to verify user identity. Vouching users may confirm a user's identity via a group communication session or by proving physical proximity to the user. Physical proximity may be proven by tapping a token, such as an electronic device or a transaction card, to either the user's device and/or the vouching user's device. Using trusted friends and family members to verify a user's identity safeguards online accounts from deep fake AI creations and protects susceptible online users from phishing schemes and social engineering attacks.

20 Claims, 13 Drawing Sheets

600

Receive a login request comprising authentication credentials ⟋ 605

610 — Authentication credentials verified? → Deny account access ⟋ 615
Y / N

620 — User enabled MFA? ⤏ Grant account access ⟋ 625
Y / N

Send secondary authentication verification options ⟋ 630

Receive selected authentication verification option ⟋ 635

Send verification request ⟋ 640

Receive verification request response ⟋ 645

Display interface ⟋ 650

Receive token ⟋ 655

Grant account access ⟋ 660

(56) References Cited

U.S. PATENT DOCUMENTS

| | | | |
|---|---|---|---|
| 11,627,129 B2 * | 4/2023 | Shah ........................ | H04L 63/20 |
| | | | 726/4 |
| 12,192,211 B2 * | 1/2025 | Guan ................... | H04L 63/0884 |
| 2002/0032573 A1 | 3/2002 | Williams et al. | |
| 2009/0216831 A1 * | 8/2009 | Buckner ............ | G06Q 20/4014 |
| | | | 709/202 |
| 2014/0096212 A1 * | 4/2014 | Smith ..................... | G06F 21/35 |
| | | | 726/7 |
| 2014/0365354 A1 | 12/2014 | Shvarts | |
| 2015/0121544 A1 | 4/2015 | He | |
| 2016/0065374 A1 | 3/2016 | Sauerwald et al. | |
| 2018/0078843 A1 | 3/2018 | Tran et al. | |
| 2018/0129797 A1 * | 5/2018 | Rush ........................ | G10L 17/00 |
| 2019/0287094 A1 * | 9/2019 | Fisher ................... | G06Q 20/354 |
| 2019/0294768 A1 * | 9/2019 | McMurdie ............ | H04L 67/306 |
| 2020/0042723 A1 * | 2/2020 | Krishnamoorthy ..... | G06F 21/45 |
| 2020/0112569 A1 * | 4/2020 | Goenka ................. | H04W 12/08 |
| 2021/0184858 A1 * | 6/2021 | Perry ...................... | G06F 21/31 |
| 2021/0224901 A1 | 7/2021 | Jiang | |
| 2022/0060469 A1 * | 2/2022 | Yee ........................ | H04L 63/102 |
| 2023/0096899 A1 * | 3/2023 | Smith-Rose ........ | H04L 63/1416 |
| | | | 726/4 |
| 2023/0412610 A1 * | 12/2023 | Goldstein ........... | H04L 63/0838 |
| 2024/0106649 A1 * | 3/2024 | Berry .................... | H04L 9/3239 |

OTHER PUBLICATIONS

Martin, "Technology Advisor Update—Autumn 2023" Karten Network, https://karten-network.org.uk/newsletter-article-category/update-from-mobile-technology-advisor/, Sep. 15, 2023, pp. 1-331.

"Help a friend or family member as their account recovery contact" Apple, https://support.apple.com/en-us/HT212515, retrieved Nov. 3, 2022, pp. 1-9.

"Choose friends to help you log in if you ever get locked out of your account." Facebook, https://www.facebook.com/help/119897751441086, website visited Oct. 19, 2023, pp. 1-3.

Matt Vasilogambros "Will Your Facebook Friends Make You a Credit Risk" The Atlantic, https://www.theatlantic.com/politics/archive/2015/08/will-your-facebook-friends-make-you-a-credit-risk/432504/, Aug. 7, 2015, pp. 1-5.

* cited by examiner

Send request to log into accout    705

Receive secondary authentication options    710

Send selection of secondary authentication options    715

Display interface    720

Receive first token    725

Send second token to second electronic device    730

Send first token to server    735

Access account    740

800

Receive request to verify first user identity          805

Send response          810

Display interface          815

Send first token to first device          820

Receive second token          825

Send second token to server          830

900

FIG. 10                <u>1000</u>
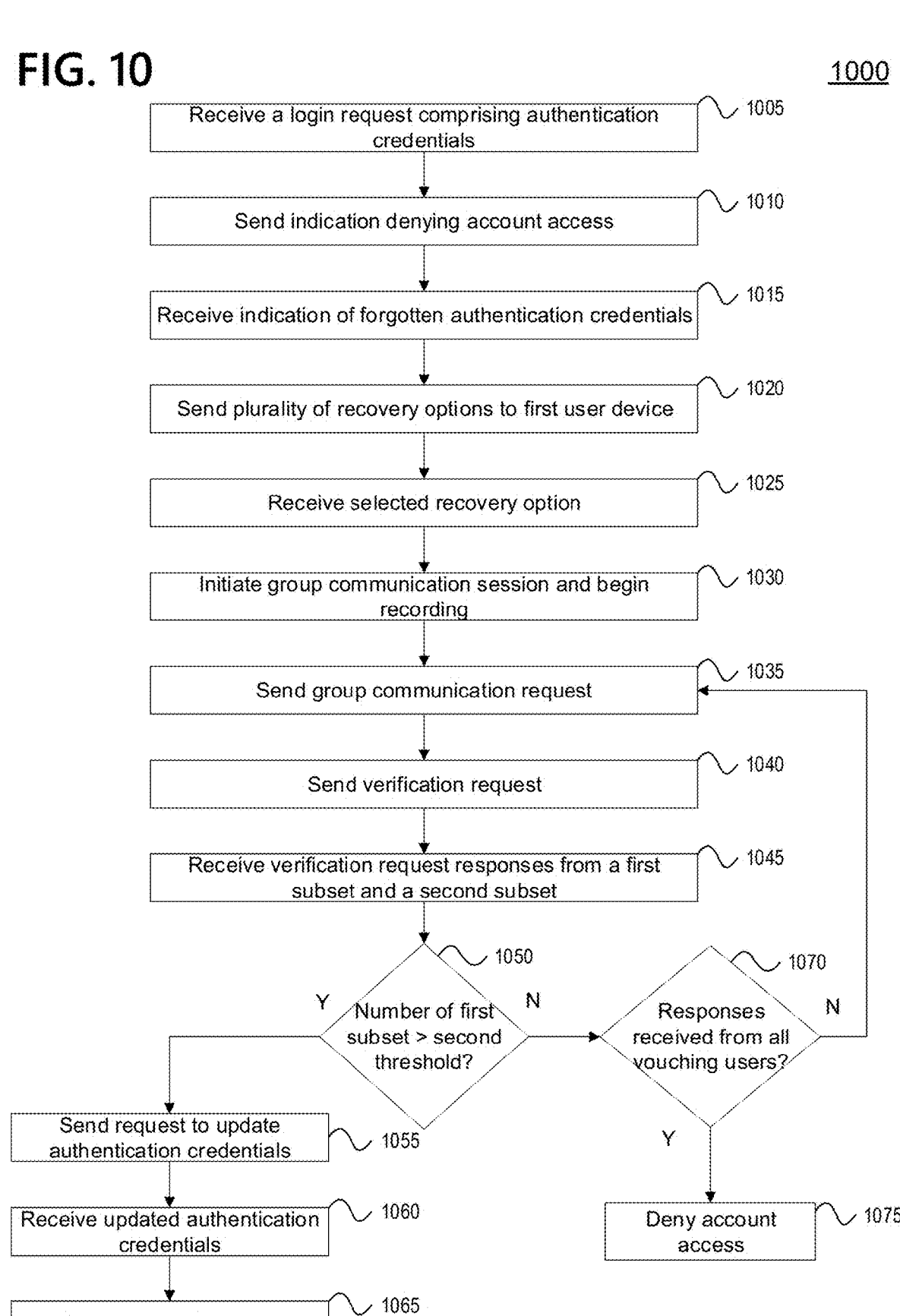

FIG. 11                                                   <u>1100</u>

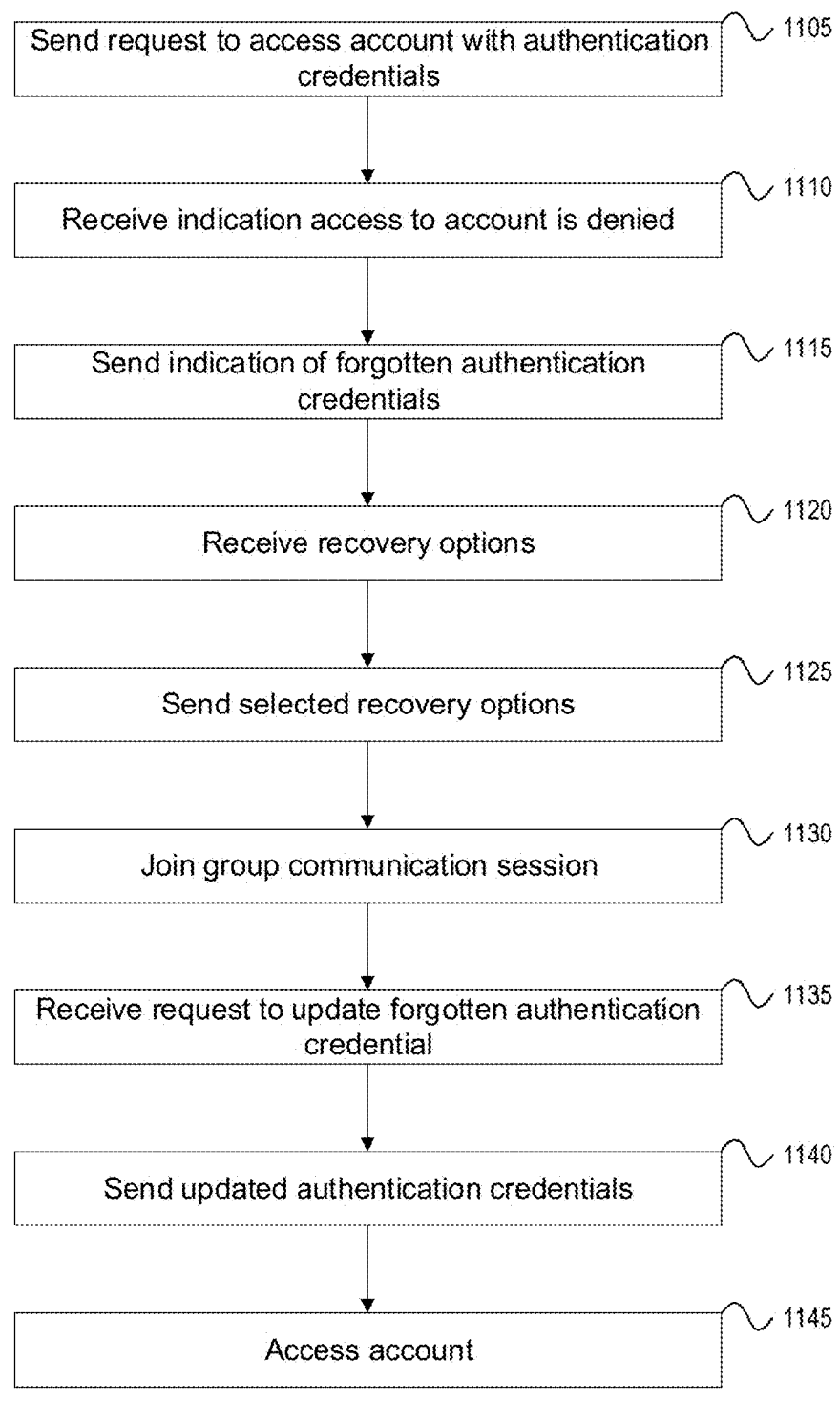

Send request to access account with authentication credentials     1105

Receive indication access to account is denied     1110

Send indication of forgotten authentication credentials     1115

Receive recovery options     1120

Send selected recovery options     1125

Join group communication session     1130

Receive request to update forgotten authentication credential     1135

Send updated authentication credentials     1140

Access account     1145

FIG. 12                                                                1200
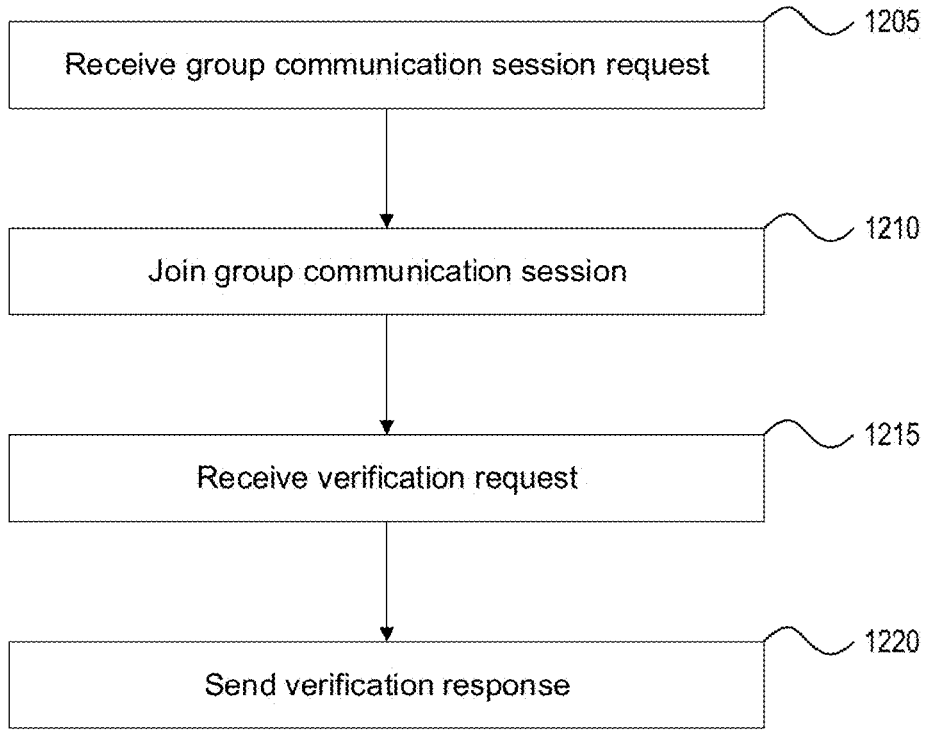
Receive group communication session request          1205
Join group communication session          1210
Receive verification request          1215
Send verification response          1220

VERIFYING A TRUSTED ENTITY'S IDENTIFICATION VIA PROXIMITY-BASED DATA

REFERENCE TO RELATED APPLICATIONS

This application is related to U.S. application Ser. No. 18/381,860, filed Oct. 19, 2023, now U.S. Pat. No. 12,519, 779, filed concurrently herewith and entitled "Crowdsourcing and Verifying a Trusted Entity's Identification," which is hereby incorporated by reference in its entirety for all purposes.

TECHNICAL FIELD

Aspects of the disclosure relate generally to verifying a first user's identity by crowdsourcing. After registering one or more trusted members of their community as a vouching user, the first user may request one or more vouching users verify the first user's identity in real time. More specifically, aspects of the disclosure may provide for enhanced online security while concurrently providing flexible user authentication options.

BACKGROUND OF THE INVENTION

In recent years, online users have experienced escalating cybersecurity threats to online accounts. Increasing data breaches that reveal passwords, authentication credentials, and other private information leading to account takeovers have become a daily threat. These data breaches frequently stem from deep fake AI creations able to circumvent current authentication procedures. Further, new users to technology, as well as users who may frequently need help with their online accounts (e.g., the elderly, those who consistently forget passwords, the intellectually challenged, etc.), are naturally more susceptible to phishing schemes and social engineering attacks. Therefore, there is a need to implement safeguards that allow users to verify their identity using trusted friends and family, thereby protecting online accounts from fraud and identity theft.

Aspects described herein may address these and other problems, and generally improve the quality, efficiency, and security of user identification verification systems by offering improved user authentication options through registering trusted friends and family members as vouching users, then requesting the vouching users to confirm user identity.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow a first user to verify their identity by first registering trusted friends and/or family members as vouching users, then requesting one or more vouching users' assistance to verify the first user's identity. This may have the effect of assuring and ensuring secure access to online accounts in the event of a forgotten authentication credential, during a multifactor authentication (MFA) process, and/or the like. According to some aspects, these and other benefits may be achieved by initiating a group communication session after registering vouching users. During the group communication session, one or more vouching users may verify the identity of the first user. For example, this may be affected by launching a livestream, video call, conference call, or a phone call on the first user's phone, then having vouching users join the livestream, video call, conference call, or call and verify the first users' identity. Confirmation of the first user's identity may be confirmed, for example, when a threshold quantity of verifications confirms the first user's identity.

In another example, verification of the first user's identity may be accomplished, for example, based on physical proximity between the first user and one or more vouching users. The verification process may begin with a first electronic device, associated with the first user, transmitting, to a server, a request to verify the first user's identity based on the first user being proximately located to one or more vouching users. The request to verify the first user's identity may comprise an indication of one or more vouching users proximately located to the first user. In response to the request to verify the first user's identity, the server may cause a first interface to be displayed via the first electronic device. The first interface may prompt the one or more vouching users to tap a device (e.g., a second electronic device associated with a vouching user, a transaction card associated with a vouching user, etc.) to the first interface to verify the first user's identity and confirm that the one or more vouching users are proximately located to the first user. In a different example, the server may cause a second interface to be displayed on a second electronic device associated with a vouching user. The second interface may prompt the first user to tap a device (e.g., the first electronic device, a transaction card associated with the first user, etc.) to the second interface to attest that the vouching user verifies the first user's identity and confirm that the first user is proximately located to the vouching user. In some instances, the server may cause both interfaces to be displayed to allow the first user and the one or more vouching users to perform mutual verification. After receiving verification of the first user's identity from a predetermined number of vouching users, the server may provide the first user with access to an account. By confirming that the first user and the one or more vouching users are in close physical proximity, the reliability of verification is improved by confirming that the first user and the one or more vouching users are in each other's physical presence and that malicious actors are not attempting to access the account.

Further aspects described herein may provide for a first user to register trusted friends and/or family as vouching users. The first user may send information regarding their trusted friends and family to a server. The server may invite the selected friends and family to register as a vouching user for the first user. Upon acceptance, the server may register the friend and/or family member as a vouching user for the first user. As noted above, the vouching users may be used to verify and/or confirm an identity of the first user, for example, as part of a multifactor authentication or as part of one or more recovery processes for a lost or forgotten authentication credential.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited to the accompanying figures in which like reference numerals indicate similar elements and in which:

FIG. 10 depicts an example of a verification process according to one or more aspects of the disclosure;

FIG. 11 depicts an example of a verification process according to one or more aspects of the disclosure;

FIG. 12 depicts an example of a verification process according to one or more aspects of the disclosure;

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for using vouching users to confirm a first user's identity, for example, during multifactor authentication, lost or forgotten authentication credentials, and the like. As discussed further herein, the combination of features may allow for verification of the first user's identity by trusted friends, family, coworkers, and/or the like, thereby safeguarding online account access and protecting users from identity theft. This provides an improvement over conventional techniques, such as one-time codes and emailing links for password recovery. In this regard, one-time codes and emailing links for password recovery may not provide security, for example, if the user's device has been compromised and the malicious actor has access to the user's device and/or the user's email account. That is, the malicious actor may access the one-time codes and/or links for password recovery if the malicious actor has the user's device and/or access to the user's email account. To improve security over conventional techniques, the present disclosure provides verification processes which receive verification of a first user's identity from one or more vouching users. This prevents the malicious actor from gaining access to the user's accounts even if the malicious actor has the user's device and/or access to the user's email account. Moreover, this improves security based on the one or more vouching users not verifying the malicious actor when the malicious actor attempts to access the one or more accounts.

Before discussing these concepts in greater detail, however, several examples of a computing device that may be used in implementing and/or otherwise providing various aspects of the disclosure will first be discussed with respect to FIG. 1.

Figure 1:
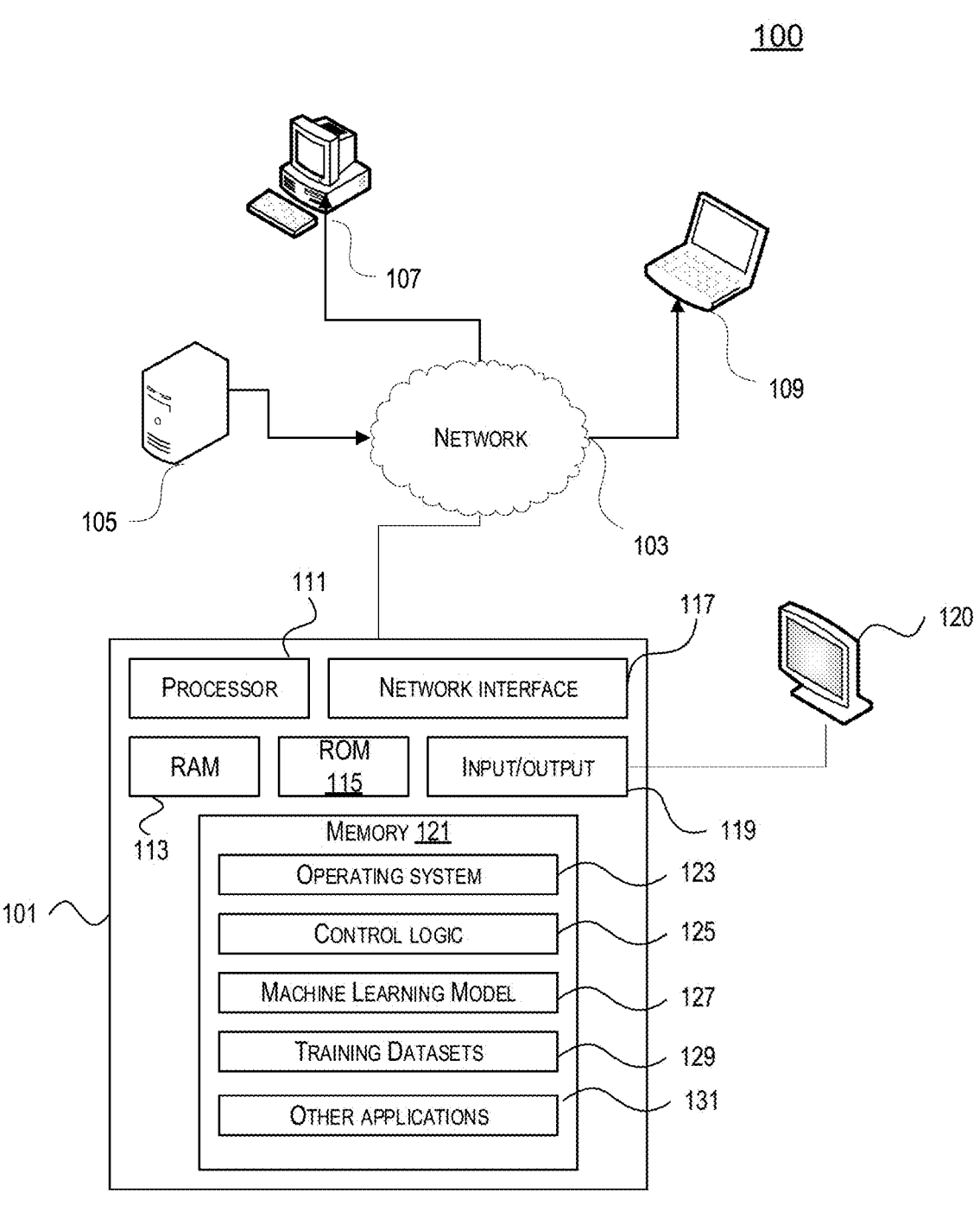
FIG. 1 depicts an example of a computing device that may be used in implementing one or more aspects of the disclosure in accordance with one or more illustrative aspects discussed herein.

FIG. 1 illustrates one example of an operating environment 100 comprising a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment or with one or more computing devices and/or networks, as shown at 100. In others, computing device 101 may operate in a networked environment. As shown in FIG. 1, various network nodes 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display, such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, one or more machine learning models 127, training datasets 129, and/or other applications 131. Control logic 125 may be incorporated in and may be a part of machine learning model 127. Machine learning model 127 may include one or more of a generative adversarial network (GAN) model, a convolutional neural network (CNN) model, a recurrent neural network (RNN) model, a random forest model, an autoencoder model, a variational autoencoder model, a synthetic data model, deep learning architectures, any artificial neural network, or the like. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or one or more machine learning models 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, Perl, or any equivalent thereof. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

The data transferred to and from various computing devices in operating environment 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the operating environment 100 in front of one or more computing devices such that any external devices may communicate directly with the specialized hardware.

Figure 2:
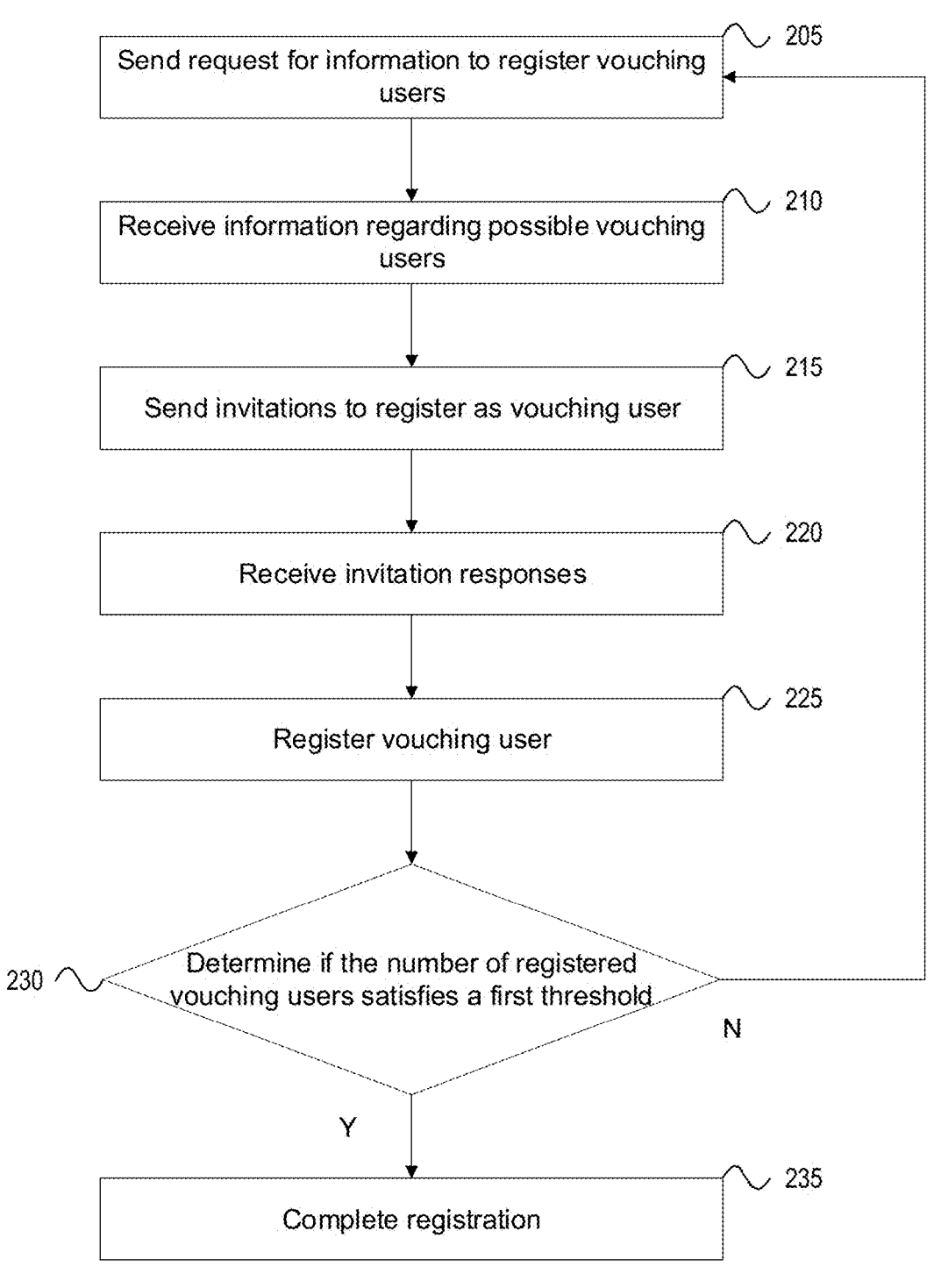
FIG. 2 depicts a flow chart for a method for registering one or more vouching users according to one or more aspects of the disclosure.

Having discussed several examples of computing devices which may be used to implement some aspects as discussed further below, discussion will now turn to a method for registering vouching users. FIG. 2 illustrates an example method 200 for a server registering vouching users in accordance with one or more aspects described herein. Method 200 may be implemented by any computing device, or combination of computing devices, described herein, including, for example, computing devices 101, 105, 107, and/or 109.

At step 205, a server may send a request to a first electronic device, associated with a first user, for information regarding registering one or more second users as vouching users. The request may be associated with an onboarding process, an account setup procedure, and/or a Know Your Customer (KYC) protocol. Vouching users may be one or more of the first user's friends, family, coworkers, and/or the like ("trusted friends") who may confirm, validate, or otherwise authenticate the first user's identity in real time. Further, verification (confirmation, validation, authentication) of a first user's identity may be verified (confirmed, validated, authenticated) within a predetermined time period. The request may be sent via an electronic communication, such as an email, a phone message, a phone call, a text message, an SMS message, an MMS message, an instant message, a push notification, and/or the like. Additionally or alternatively, the request may be transmitted via a messaging service, a messaging application, and/or the like.

At step 210, the server may receive, from the first electronic device, information regarding the one or more second users. The information may indicate one or more second users ("trusted friends") that the first user would like to register as vouching users. The information may comprise names, addresses, emails, phone numbers, contact information, and/or the like. Further, the information may indicate a first threshold quantity (e.g., number) of registered vouching users needed to complete vouching user registration. Alternatively, the first threshold quantity of registered vouching users needed to complete vouching user registration may be configured by the server. Additionally, the information may indicate a second threshold quantity (e.g. number) of vouching users needed to confirm the first user's identity during identity verification. Alternatively, the second threshold quantity of registered vouching users needed to verify a user's identity may be configured by the server. As will be discussed in greater detail below with respect to step 215, the server may use the information to contact and/or register these trusted friends as vouching users. Further, the server may confirm the information with information stored in a database. For example, the server may compare names and addresses with a database of previously known names and addresses. Additionally, the information may include a personal message from the first user to the one or more second users. The personal message may be in the form of a video message, an audio message, a written message, and/or the like.

Figure 5:
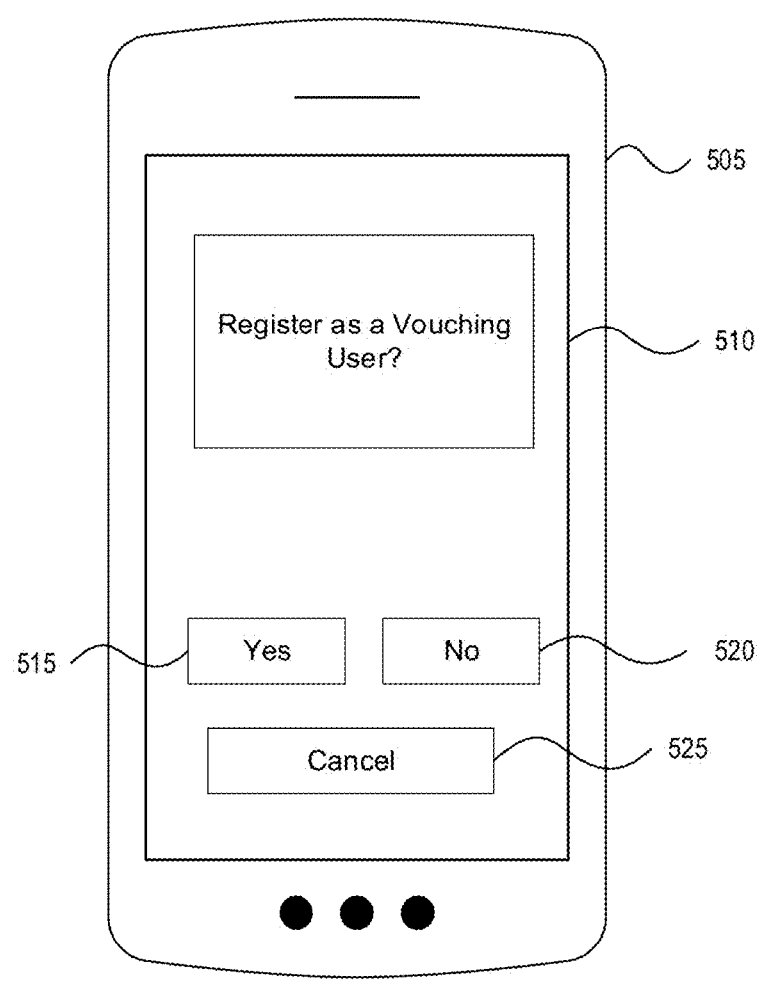
FIG. 5 shows an example of an interface for registering as a vouching user according to one or more aspects of the disclosure.

At step 215, the server may send, to the one or more second users, one or more invitations to register as a vouching user for the first user. The one or more invitations may be transmitted via an electronic communication, such those described above. The one or more invitations may include an explanation of why the trusted friend is being contacted, information regarding the duties of a vouching user, links and/or phone numbers of where the trusted friend may find further information, and/or the like. As shown in FIG. 5 and discussed in greater detail below, the one or more invitations may allow each of the one or more second users to accept or decline registration as a vouching user. Additionally, the one or more invitations may allow each of the one or more second users to cancel the invitation without accepting or denying the request. Further, the one or more invitations may include the personal message, from the first user, to the second user.

At step 220, the server may receive one or more responses from the one or more second users. The one or more responses may comprise an indication that a first subset of the one or more second users agrees to be a vouching user for the first user. Further, the one or more responses may comprise an indication that a second subset of the one or more second users do not agree (e.g., reject) to be a vouching user for the first user. The one or more responses may be received via an electronic communication, such as those described above. Additionally or alternatively, the one or more responses may comprise an indication of the respective second user's preference on how they would like to be contacted. For example, the one or more confirmations may indicate that a first respective second user prefers to be contacted via text message, while a second respective second user prefers to be contacted via a phone call.

At step 225, the server may register each respective second user as a vouching user, for example, based on or in response to receiving a confirmation from the respective second user. Registration may comprise storing each of the respective second user's associated information in a database, a table, a memory, and/or the like. Further, the server may provide a prompt to the trusted friend to provide a username, password, and/or other login information, as well as information where the trusted friend may access, change, and/or update their personal information. The personal information may include the trusted friend's name, address, email, phone number, social media handle, username for a messaging application, username for a messaging service, and/or the like. The server may access this information to contact the registered vouching user, for example, when the first user requires identity verification. Further, the server may send the first user notification of registered vouching users. The notification may include the vouching users' names, contact information, and/or the like.

At step 230, the server may determine if the number of registered vouching users satisfies the first threshold. The first threshold requires a set number of registered vouching users before the user may complete registration. If the number of registered vouching users does not satisfy the first threshold at step 230, the server may revert to step 205 and send additional requests for information to the first user in order to register further vouching users.

At step 235, the server may complete registration of vouching users, for example, if the number of registered vouching users satisfies the first threshold. The server may send, to the first electronic device, a notification that the vouching user registration is complete. At this point, the first user may now request vouching users' assistance to verify the first user's identity as described further below.

Figure 3:
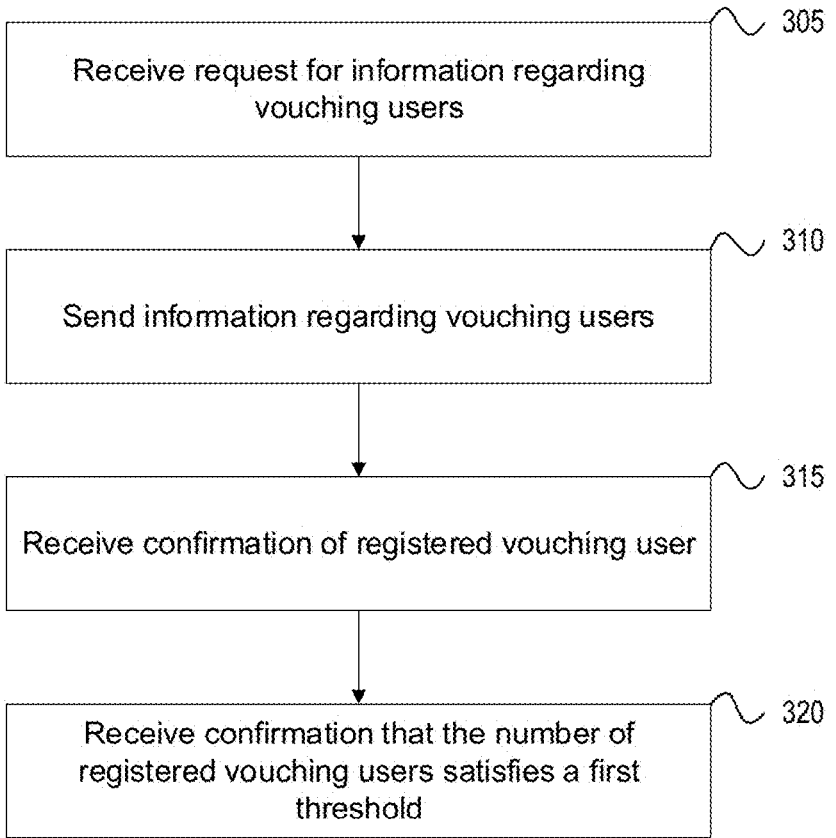
FIG. 3 depicts a flow chart for a method for registering one or more vouching users according to one or more aspects of the disclosure.

FIG. 3 illustrates an example method 300 for a first electronic device registering one or more vouching users in accordance with one or more aspects described herein. Method 300 may be implemented by any computing device, or combination of computing devices, described herein, including, for example, computing devices 101, 105, 107, and/or 109.

At step 305, the first electronic device may receive a request, from a server, for information to register one or more trusted friends as vouching users. The request, for example, may be received during an account setup and/or an enrollment process. Additionally or alternatively, the request may be received during the lifetime of an active account. The request may be received via an electronic communication, such as an email, a phone message, a phone call, a text message, an SMS message, an MMS message, an instant message, a push notification, and/or the like. Additionally or alternatively, the request may be received via a messaging service, a messaging application, and/or the like.

At step 310, the first electronic device may send information associated with one or more trusted friends in response to the request to register one or more trusted friends as vouching users. The information may comprise the names and/or contact information of the one or more trusted friends. The contact information may comprise one or more addresses, email addresses, phone numbers, social media handles, usernames, and/or the like. As noted above, with respect to step 215 of FIG. 2, the server may use the information to contact the one or more trusted friends to invite the one or more trusted friends to register as a vouching user. Further, the information may include a personal message, from the first user, to the one or more trusted friends. The personal message may be in the form of a video message, an audio message, a written message, and/or the like.

At step 315, the first electronic device may receive, from the server, confirmation that one or more trusted friends have successfully registered as vouching user(s). The confirmation may be received in the form of an electronic communication, such as those described above. The confirmation may include the trusted friend's contact information, a message from the trusted friend, and/or a request from the trusted friend to register the first user as a vouching user for the trusted friend.

At step 320, the first electronic device may receive confirmation that the number of registered vouching users satisfies the first threshold, indicating that vouching user registration is complete. The confirmation may be received in the form of an electronic communication, such as those described above. The confirmation may include information regarding the trusted friends who have successfully registered as a vouching user. Additionally, the confirmation may include information regarding trusted friends who have not successfully registered as a vouching user and/or declined registration as a vouching user. After registration has been completed, the first user may request vouching users' assistance to verify the first user's identity, for example, as part of an MFA process, as part of a recovery of a lost, stolen, or forgotten authentication credential, and/or during occasions where the first user may need their identity verified. Such occasions may comprise pre-boarding during air travel, opening a financial account, applying for a library card, renewing a driver's license, and/or the like.

Figure 4:
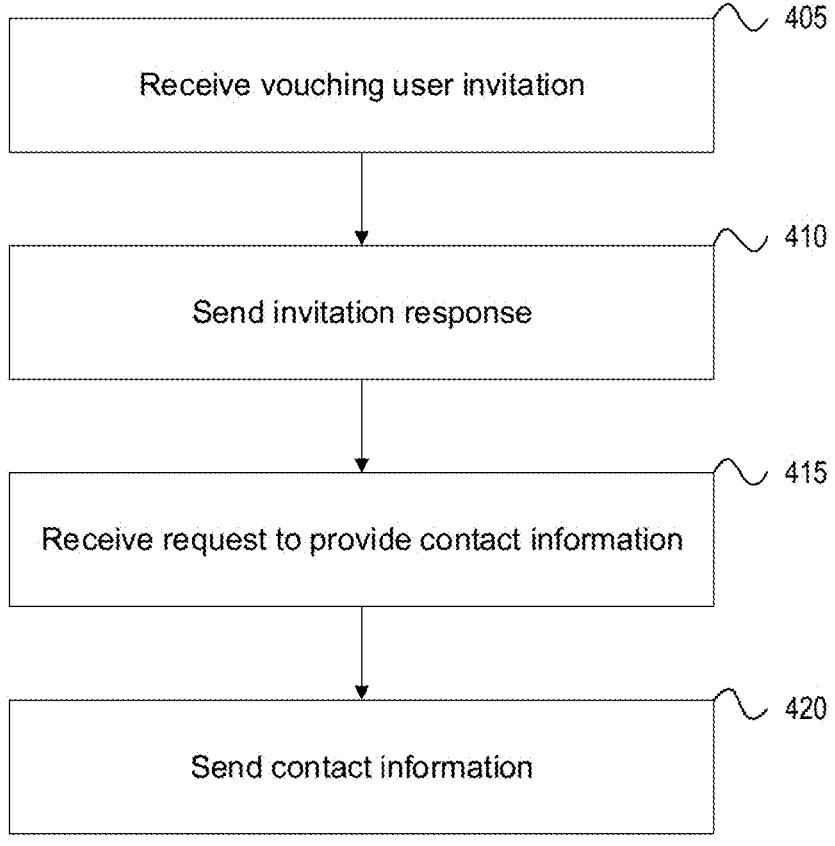
FIG. 4 depicts a flow chart for a method for registering as a vouching user according to one or more aspects of the disclosure.

FIG. 4 illustrates an example method 400 for a second electronic device registering a vouching user in accordance with one or more aspects described herein. Method 400 may be implemented by any computing device, or combination of computing devices, described herein, including, for example, computing devices 101, 105, 107, and/or 109.

At step 405, the second electronic device may receive, from the server, an invitation to register as a vouching user for the first user. The invitation may be received in the form of an electronic communication, such as an email, a phone message, a phone call, a text message, an SMS message, an MMS message, an instant message, a push notification, and/or the like. Further, the invitation may be received via a messaging service, a messaging application, and/or the like. The invitation may include an explanation of why the invitation is being sent, information regarding the duties of a vouching user, links and/or phone numbers of where to find further information, and/or the like. Additionally, the invitation may include a personal message, from the first user, to the vouching user. The personal message may be in the form of a video message, an audio message, a written message, and/or the like. As shown in FIG. 5, the request may allow the trusted friend to approve or decline registration as a vouching user. FIG. 5 illustrates an example of an interface 510. Interface 510 may be displayed on a second electronic device, such as electronic device 505. Interface 510 may provide the second user several options, such as accepting the invitation via "Yes" button 515 or declining the offer via "No" button 520. Interface 510 may also comprise a "Cancel" button 525, which may allow the second user to decline the invitation via cancellation.

At step 410, the second electronic device may send, to the server, a response to the invitation. The response may indicate that the second user accepts the role of a vouching user for the first user, for example, if the second user selected the "Yes" button 515 in FIG. 5. Alternatively, the response may indicate that the second user rejects the role of a vouching user, for example, based on the second user selecting either the "No" button 520 or the "Cancel" button 525. The response may be sent in the form of an electronic communication, as described above. Further, the response may include a personal message from the second user to the first user. The personal message may be in the form of a video message, an audio message, a written message, and/or the like. If the second user elected to reject the role of a vouching user, method 400 may conclude without any further steps. However, if the second user accepted the role of a vouching user, method 400 may proceed to step 415.

At step 415, the second electronic device may receive a request to provide contact information in order to register as a vouching user for the first user. The request may be received in the form of an electronic communication, as described above. Further, the request may ask the second user to confirm previously acquired personal information.

At step 420, the second electronic device may send contact information to the server. The contact information may comprise one or more email addresses, addresses, phone numbers, social media handles, usernames, and/or the like. Further, the second electronic device may confirm, deny, or correct previously presented personal information.

After registering one or more vouching users, the first user may request the one or more vouching users verify their identity, for example, as part of an MFA process or part of a credential recovery procedure. Verifying the first user's identity may involve a demonstration of physical proximity between the first user and one or more vouching users. The demonstration of physical proximity may include an exchange of one or more tokens. For example, the first electronic device may receive a first token from the one or more vouching users via a first interface on the first device. The first electronic device may send the first token to the server to confirm identification of the first user. Additionally or alternatively, the second electronic device may receive a second token from the first user via a second interface on the second electronic device. The second electronic device may send the second token to the server, thereby confirming the first user's identity.

Figure 6:
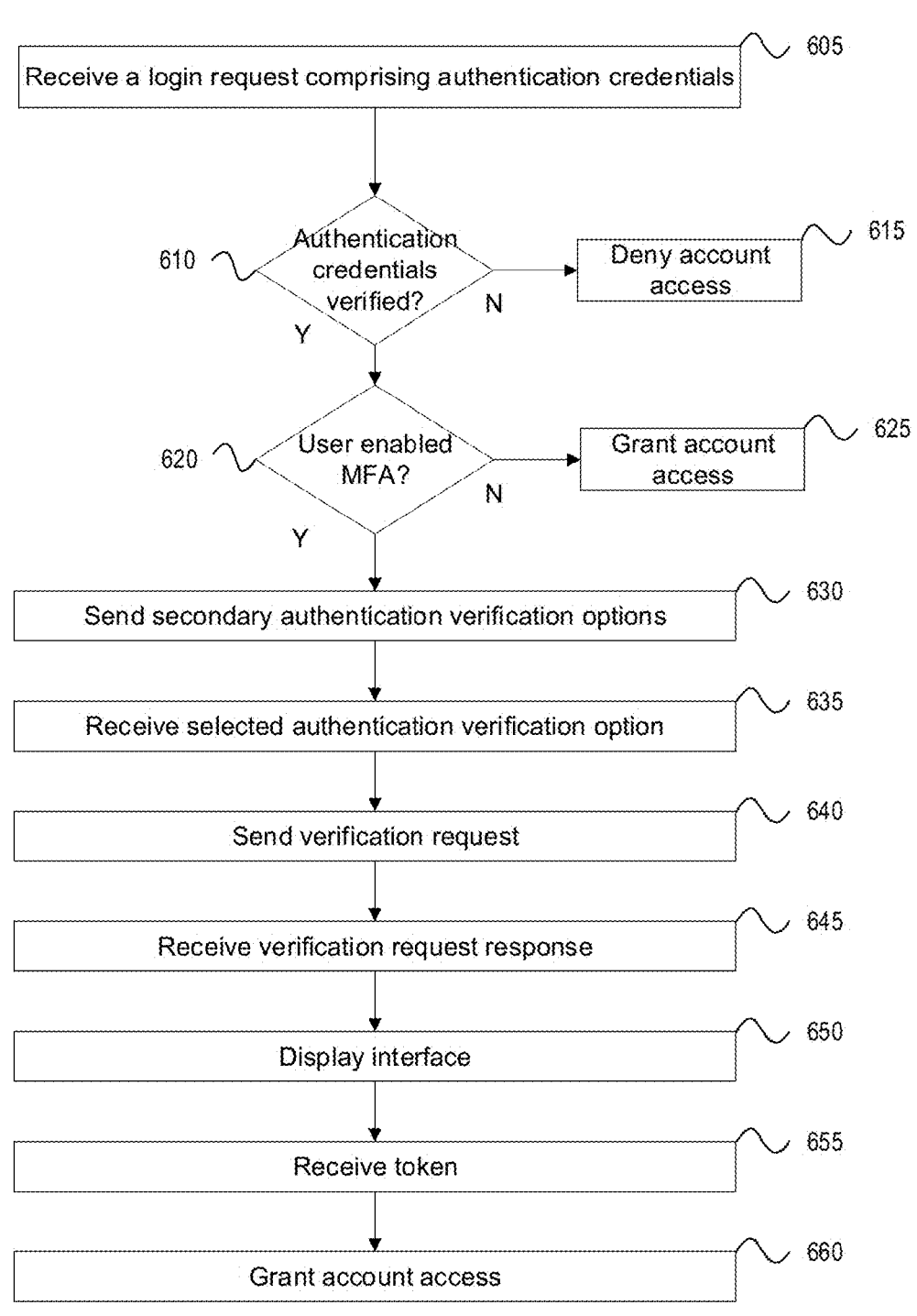
FIG. 6 depicts an example of a verification process according to one or more aspects of the disclosure.

FIG. 6 illustrates an example method 600 for verifying a first user's identity based on a demonstration of physical proximity between the first user and one or more vouching users in accordance with one or more aspects described herein. Method 600 may be implemented by any computing device, or combination of computing devices, described herein, including, for example, computing devices 101, 105, 107, and/or 109.

At step 605, a server may receive, from a first electronic device, a request to login to an account associated with a first user. The account may be a social media account, a financial account, an email account, an electronic device access, and/or the like. Further, the request to access the account may be received via a GUI deployed as part of a service (e.g., a Software-as-a-Service (SaaS)) offered through, for example, a mobile application, a website, a web portal, etc. Along with the request, the server may receive authentication credentials from the first electronic device. The received authentication credentials may be one or more of a username, password, biometric identifier, behavior-based information, location, and/or the like. The authentication credentials may be associated with protocols such as single-factor/primary authentication, Two-Factor Authentication (2FA), Single Sign-On (SSO), MFA process, and/or the like.

At step 610, the server may determine if the received authentication credentials are verified. To verify the authentication credentials, the server may compare the received authentication credentials with previously stored (registered) authentication credentials. The previously stored authentication credentials associated with the first user may be stored in a database, for example, as part of an enrollment or account setup process. If the received authentication credentials do not match the previously stored authentication credentials, the server may deny access to the account, in step 615. In some instances, the server may send the first electronic device an alert informing the first user of a failed login request, which may be indicative of a possible attack on the account. Additionally, the server may allow a certain number of verification attempts from the first electronic device before locking out the first electronic device for a predetermined amount of time.

If the received authentication credentials match the previously stored authentication credentials, the server may determine whether the first user previously enabled multifactor authentication, in step 620. The first user may enable multifactor authentication, for example, during enrollment or account setup process. If the server determines that the first user did not enable multifactor authentication, the server may grant access to the account, at step 625. Additionally, the server may send, to the first electronic device, a prompt providing an opportunity for the first user to set up multifactor authentication for the account.

If the server determines that the first user has previously enabled multifactor authentication, the server may send, to the first electronic device, a request for secondary authentication verification, in step 630. The request for secondary authentication verification may provide the first user with one or more options. For example, the one or more options may comprise entering a one-time code, a biometric identifier, behavior-based information, and/or verification of the first user's identity by one or more vouching users.

At step 635, the server may receive, from the first electronic device, a selection of the one or more options for the secondary authentication verification. Selection of the one-time code, the biometric identifier, and/or the behavior-based information is beyond the scope of this disclosure. For the purposes of this disclosure, we will focus on the first user selecting verification of the first user's identity by one or more vouching users.

At step 640, the server may send, to one or more second electronic devices, a request to verify the first user's identity, for example, in response to receiving the selection to verify the first user's identity by requesting the services of one or more vouching users. The request may be sent via an electronic communication, such as an email, a phone message, a phone call, a text message, an SMS message, an MMS message, an instant message, a push notification, and/or the like. Additionally or alternatively, the request may be transmitted via a messaging service, a messaging application, and/or the like.

At step 645, the server may receive from one or more second electronic devices, a response to the request to verify the first user's identity. In some instances, a first respective response may comprise one or more vouching users' acceptance to verify the first user's identity. At other times, a second respective response may comprise an indication from one or more vouching users declining to verify the first user's identity. The server may send, to the first electronic device, an indication of the one or more vouching users' responses. Further, the server may store the one or more vouching users' confirmations in a memory connected to the server, in a cloud environment, and/or the like.

At step 650, the server may cause a second interface to be displayed on the one or more second electronic devices. The second interface may be a GUI deployed as part of a service as described above. The second interface may allow the one or more second electronic devices to receive a second token associated with the first user as an indication that the first user is in physical proximity to a respective vouching user. The second token may be an alphanumeric string. In some instances, the second token may be generated by tapping a card (e.g., credit card, debit card, smart card, identification card (e.g., license), etc.) to the interface. Additionally or alternatively, the second token may be generated by placing the first electronic device near the one or more second electronic devices. By placing the first electronic device near the one or more second electronic devices, the devices may exchange, send, receive, or generate tokens via a short-range wireless communication protocol, such as Bluetooth, Near Field Communications (NFC), Zigbee, Z-Wave, ANT, LoRa, or the like. The second token may comprise an indication of a respective vouching user of a second electronic device, an indication of the first user, a date, a time, a random string (e.g., a hash, a signature, a HMAC, etc.), and the like. The one or more second electronic devices may send the second token to the server, for example, in response to receiving (or generating) the second token from the first electronic device.

Additionally or alternatively, the second interface may allow the one or more second electronic devices to receive one or more identifiers associated with the first user. The one or more identifiers may be an indication that a first user is in physical proximity to the one or more vouching users. The second interface may generate the second token from the identifier. After generating the second token, the second interface may send the second token to the server to verify the first user's identity. The identifier may comprise information associated with an electronic device (e.g., a Media Access Control (MAC) address, IP address, International Mobile Equipment Identity number (IMEI), and/or the like), credit card information (e.g., credit card number, expiration date, security code, pin code, and/or the like), account information (e.g., email address, username, password, and/or the like), and/or the like.

Additionally or alternatively, the server may cause a first interface to be displayed on the first electronic device. The first interface may be the same type of interface as the second interface as described above. Further, the first interface on the first electronic device may allow the first electronic device to receive a first token associated with the vouching user as described above with respect to the second token. The first token may be received or generated using the techniques described above. Additionally, the first token may comprise the same, or substantially the same, information as described above. In response to receiving or generating the first token from the second electronic device, the first interface may allow the first electronic device to send the first token associated with the one or more vouching users to the server. Alternatively, the first interface on the first electronic device may allow the first electronic device to receive one or more identifiers associated with one or more vouching users, as described above with respect to the second interface.

In some instances, the server may cause the first interface and the second interface to be displayed on the associated devices as discussed above. In this example, the first user and the one or more vouching users may exchange tokens, for example, as a form of mutual authentication. As discussed above, the one or more second electronic devices may send a second token, associated with the first user, to the server, for example, in response to receiving or generating the second token from the first electronic device. Similarly, the first electronic device may send a first token, associated with the one or more vouching users, to the server. This mutual authentication may provide an additional layer of security.

Additionally or alternatively, the first electronic device and/or the one or more second electronic devices may confirm physical proximity between the first user and the one or more vouching users, for example, by determining that both the first electronic device and the one or more second electronic devices are connected to the same network (e.g., connected to the same wireless network, Internet provider, and/or the like). Further, the first electronic device and/or the one or more second electronic devices may confirm physical proximity between the first user and the one or more vouching users by determining that both the first electronic device and the one or more second electronic devices are physically located within a predetermined location using, for example, a GPS tracking method. For example, the first electronic device may provide a first location (e.g., latitude and/or longitude coordinates determined using GPS antenna) to the server and/or the one or more second electronic devices. The one or more second electronic devices may provide a second location to the server and/or the first electronic device. The server and/or the electronic devices may determine that the first electronic device and the one or more second electronic devices are proximately located if the first location is within a predetermined distance of the second location, or vice versa. The first electronic device and/or the one or more second electronic devices may then send confirmation of physical proximity to the server.

At step 655, the server may receive, from the one or more second electronic devices, a second token associated with the first user. Additionally or alternatively, the server may receive, from the first electronic device, a first token associated with a respective vouching user of the one or more vouching users. Further, the server may store the token(s) in an associated database, a memory connected with the server, a cloud environment, and/or the like. Upon receipt of the first and/or second tokens, the server may grant the first electronic device access to the account, at step 660.

Figure 7:
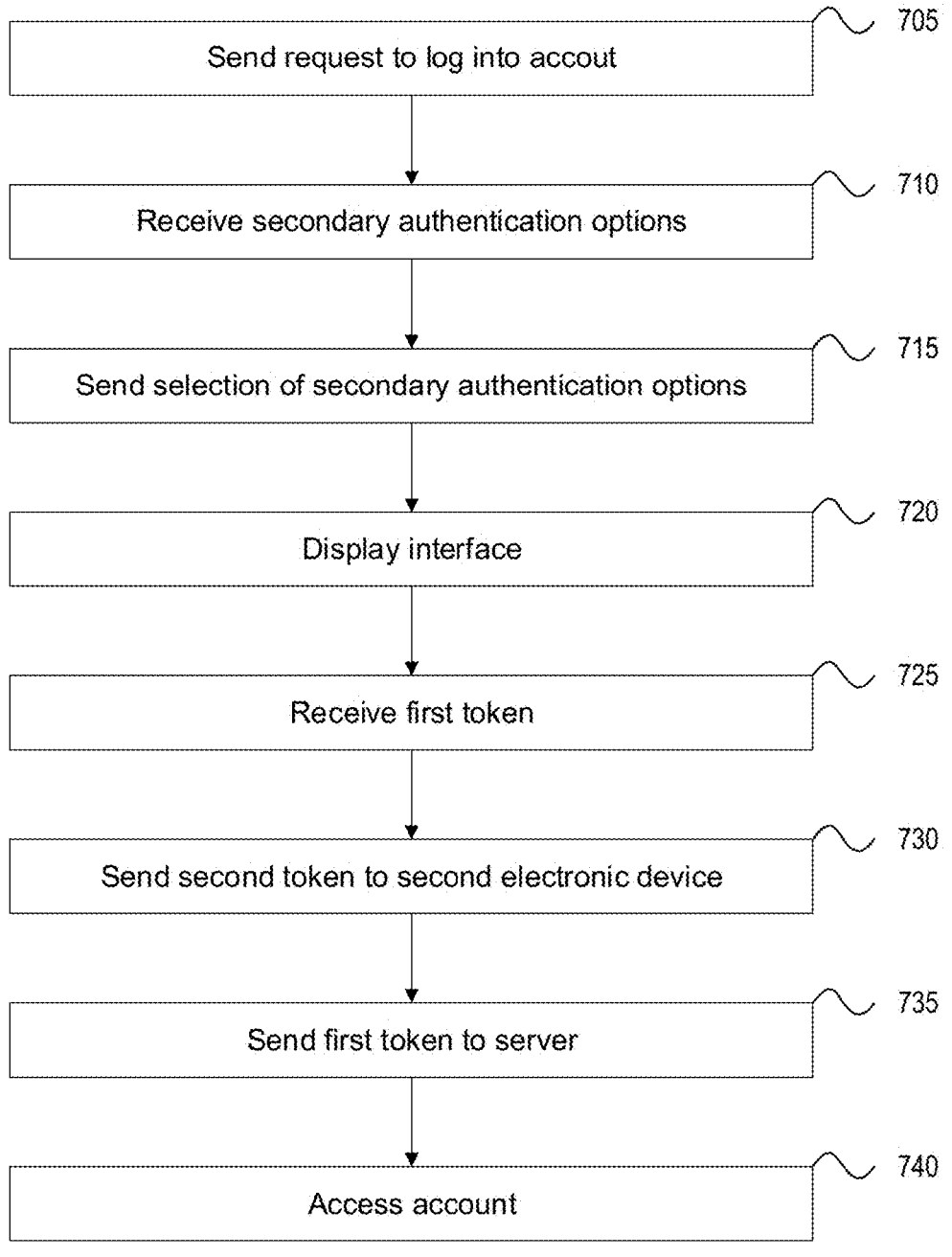
FIG. 7 depicts an example of a verification process according to one or more aspects of the disclosure.

FIG. 7 describes a method 700 of a first electronic device performing multifactor authentication in accordance with one or more aspects described herein. Method 700 may be implemented by a suitable computing system, as described further herein. For example, method 700 may be implemented by any suitable computing environment by a computing device and/or combination of computing devices, such as computing devices 101, 105, 107, and 109.

At step 705, a first electronic device may send, to a server, a request to log into an account. The account may be a social media account, a financial account, an email account, an electronic device access, and/or the like. Further, the first electronic device may send authentication credentials along with the request to log into the account. The authentication credentials may comprise one or more of a username, a password, a biometric identifier, behavior-based information, a location, and/or the like.

At step 710, the first electronic device may receive one or more secondary authentication options for verifying the first user's identity. The one or more secondary authentication options may comprise a request to select one or more secondary authentication options. The one or more secondary authentication options may include verification of the first user's identity by one or more vouching users. The one or more secondary authentication options may be sent via an electronic communication, such as an email, a phone message, a phone call, a text message, an SMS message, an MMS message, an instant message, a push notification, and/or the like. Additionally or alternatively, the electronic communication may be transmitted via a messaging service, a messaging application, and/or the like.

At step 715, the first electronic device may send, to the server, a selection of the one or more secondary authentication options. For the purposes of this disclosure, the selection may indicate verification by one or more vouching users. The selection may indicate one or more vouching users to contact as part of the identity verification. The selection may be sent via an electronic communication, as described above.

At step 720, the first electronic device may display a first interface. The first interface may be a GUI deployed as part of a service (e.g., a Software-as-a-Service (SaaS)) offered through, for example, a mobile application, a website, a web portal, etc. The first interface may allow the first electronic device to receive a first token associated with the one or more vouching users as an indication that the first user is in physical proximity to a respective vouching user of the one or more vouching users, at step 725. The first token may be an alphanumeric string, as described above. The first token may be received or generated by the respective vouching user tapping a card (e.g., credit card, debit card, smart card, identification card (e.g., license), etc.) to the first interface. Additionally or alternatively, the first token may be received or generated by placing a respective second electronic device near the first electronic device. By placing the respective second electronic device near the first electronic device, the first electronic device may receive information to generate the first token via a short-range wireless communication protocol, such as those discussed above. As noted above, the first token may comprise an indication of a respective user of the respective second electronic device, an indication of the first user, a date, a time, a random string (e.g., a hash, a signature, a HMAC, etc.), and the like.

Additionally or alternatively, the first token may comprise an image of a personal identification document associated with the respective vouching user. The first electronic device may acquire the image of the personal identification document, for example, using a camera associated with the first electronic device. The first electronic device may upload the image of the vouching user's personal identification document using the first interface. The personal identification document may be one or more of a driver's license, a professional license, an identification card, a birth certificate, a transaction card, a social security card, a financial card, a military card, a passport, a residency card, and/or the like.

In some examples, the first electronic device may send a second token, associated with the first user, to a respective second electronic device, of the one or more second electronic devices, at step 730. The second token may indicate physical proximity between the first user and the one or more vouching users. The second token may be sent to or generated by the respective second electronic device in response to the first user tapping the first electronic device to the respective second electronic device. As noted above, the second token may be transferred via a short-range wireless protocol.

At step 735, the first electronic device may send the first token to the server to confirm the first user's identity. The first token may be sent to the server through the first interface. After the first token is sent to the server and the server verifies the first token, the first electronic device may access the account, at step 740.

Figure 8:
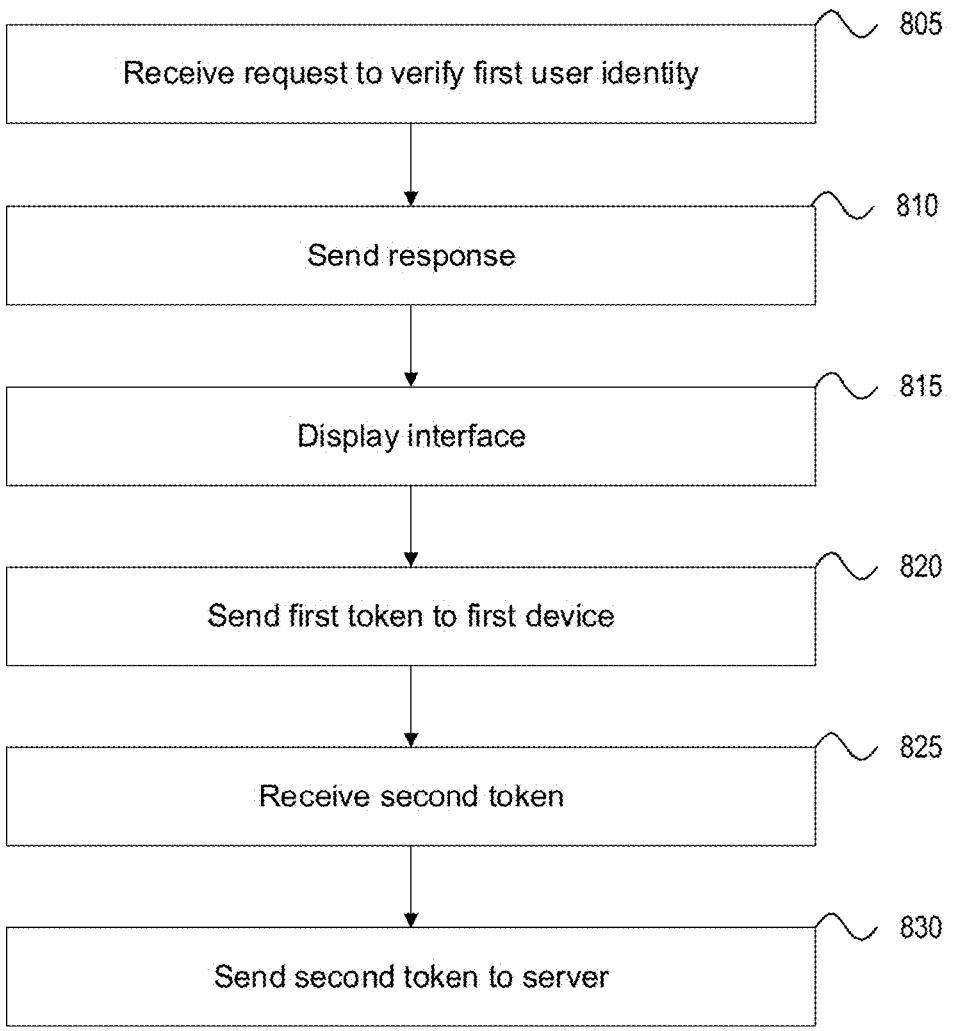
FIG. 8 depicts an example of a verification process according to one or more aspects of the disclosure.

FIG. 8 describes a method 800 of a second electronic device verifying a first user's identity in accordance with one or more aspects described herein. Method 800 may be implemented by a suitable computing system, as described further herein. For example, method 800 may be implemented by any suitable computing environment by a computing device and/or combination of computing devices, such as computing devices 101, 105, 107, and 109.

At step 805, the second electronic device may receive, from the server, a request to verify a first user's identity. The request may comprise an electronic communication such as an email, a text, a phone call, a push notification, a message via messaging application, a message via a messaging service, and/or the like. The second electronic device may send, to the server, a response at step 810. The response may comprise a confirmation indicating that a vouching user agrees to verify the first user's identity. Alternatively, the response may comprise an indication that the vouching user declines to verify the first user's identity.

Based on sending a response agreeing to verify the first user's identity, the second electronic device may display a second interface, in step 815. The second interface may be the same type of interface as the first interface described above. The second interface may allow the second electronic device to send, receive, and/or generate tokens corresponding to the first interface described above. For example, the second interface may allow the vouching user via the second electronic device to send a first token to the first user device, at step 820. The second electronic device may send the first token to the first electronic device by, for example, tapping the second electronic device to the first electronic device. The token may be transmitted (or generated) via a short-range wireless protocol, as discussed above.

Figure 9:
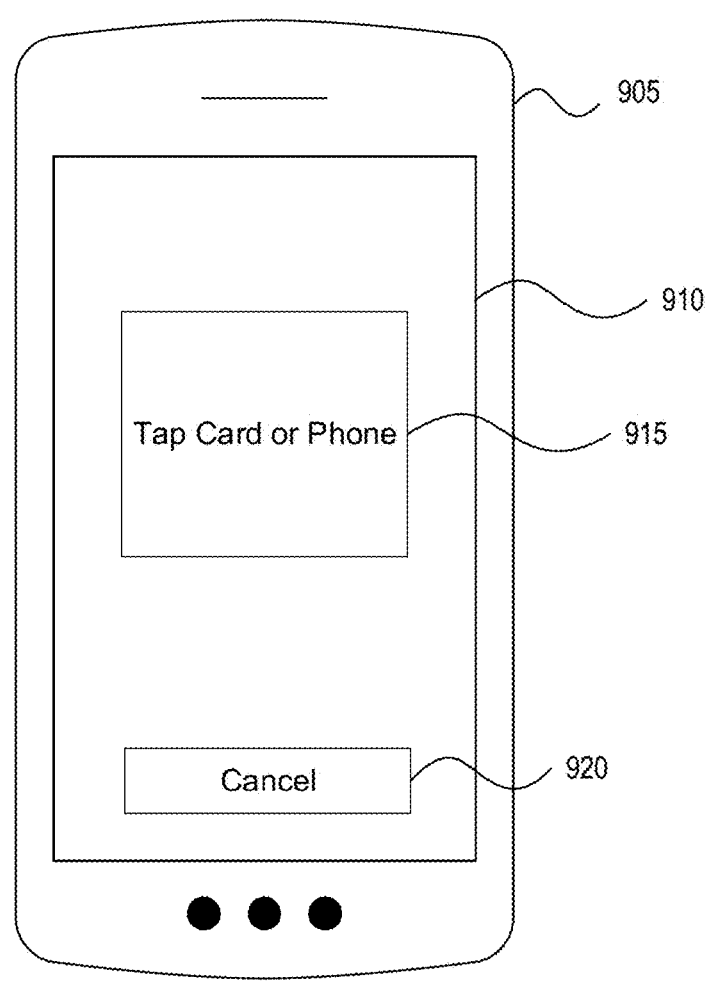
FIG. 9 is an example of an interface for verifying an identity of a first user in accordance with one or more aspects of the disclosure.

Further, the second interface may allow the second electronic device to receive (or generate) a second token from a first user, at step 825. As demonstrated in FIG. 9, the second interface 910 may be displayed on the second electronic device 905. The first user may tap a device to the second electronic device at 915. The device may comprise the first electronic device, a smart card, a transaction card, a credit card, debit card, a personal identification card, or the like. The second token may be transferred (or generated) via a short-range wireless protocol, as discussed above. Further, the second token may be generated by the second interface. The second token may comprise an indication of a respective vouching user of a second electronic device, an indication of the first user, a date, a time, a random string (e.g., a hash, a signature, a HMAC, etc.), and the like. The vouching user may cancel the process to verify the first user's identity at 920.

Additionally or alternatively, the first token may comprise an image of a personal identification document associated with the first user. The second electronic device may acquire the image of the personal identification document, for example, using an image capture device (e.g., camera) of the second electronic device. The second electronic device may upload the image of the personal identification document using the displayed second interface. The personal identification document may be one or more of a driver's license, a professional license, an identification card, a birth certificate, a transaction card, a social security card, a financial card, a military card, a passport, a residency card, and/or the like.

At step 830, the second electronic device may send the first token to the server. The token may be sent through the displayed second interface. After sending the first token to the server, the second electronic device may close the displayed second interface.

Occasionally, a first user may not be proximately located to one or more vouching users. Accordingly, the token exchange techniques described above could not be used to verify the first user's identity. In these cases, the first user may take advantage of advances in video- and group-calling. Specifically, the first user may initiate a group communication session where one or more vouching users can verify the first user's identity. As noted above, verification of the user's identity can be used as part of a multifactor authentication. Additionally, the verification techniques described herein can be used to recover lost or forgotten credentials. FIG. 10 illustrates an example method 1000 of verifying a first user's identity via a group communication session to recover one or more lost or forgotten credentials in accordance with one or more aspects of the disclosure. Method 1000 may be implemented by a suitable computing system, as described further herein. For example, method 1000 may be implemented by any suitable computing environment, by a computing device, and/or by a combination of computing devices, such as computing devices 101, 105, 107, and/or 109 of FIG. 1.

At step 1005, a server may receive, from a first electronic device, a request to login to an account associated with the first user. The account may be a social media account, financial account, email access, electronic device access, and/or the like. Further, the request to access the account may be received via a GUI deployed as part of a service (e.g., a Software-as-a-Service (SaaS)) offered through, for example, a mobile application, a website, a web portal, etc. Along with the request, the server may receive authentication credentials from the first electronic device. The received authentication credentials may be one or more of a username, password, biometric identifier, behavior-based information, location, and/or the like. The authentication credentials may be associated with protocols such as single-factor/primary authentication, 2FA, SSO, MFA process, and/or the like.

In response to determining that the received authentication credentials are not verified, the server may send, to the first electronic device, an indication denying access to the account, in step 1010. The determination that the received authentication credentials are not verified may be based on the received authentication credentials not matching the previously stored (registered) authentication credentials. The previously stored authentication credentials associated with the first user may be stored in a database, for example, as part of an enrollment or account setup process, as described above. The indication may be sent via an electronic communication, such as those described above. Further, the indication denying account access may be displayed via an interface on the first electronic device.

At step 1015, the server may receive, from the first electronic device, an indication of one or more forgotten authentication credentials. The one or more forgotten authentication credentials may comprise the same authentication credentials as described above. Additionally, the indication of one or more forgotten authentication credentials may comprise a request to reset or recover the one or more forgotten authentication credential.

At step 1020, the server may send, to the first electronic device, a plurality of recovery options. The recovery options may include verification of the first user's identity by one or more vouching users. The one or more vouching users may confirm the first user's identity, for example, in real time. Additionally, the option to recover a forgotten password may include an option that allows the first user to select (choose) one or more specific registered vouching users to whom to send a verification request.

At step 1025, the server may receive, from the first electronic device, one or more selected recovery options. For the purposes of this disclosure, the selection may comprise verification by one or more vouching users. The selection may further indicate one or more vouching users to contact as part of the identity verification. Additionally, the one or more selected recovery options may also include a selection of one or more vouching users to request verification of the first user's identity.

At step 1030, the server may initiate a group communication session. The group communication session may comprise one or more of a livestream, a phone call, a teleconference, a video call, a video conference, a chat room, and/or the like. For example, the group communication session may comprise a video livestream of the first user. After initiating the group communication session, the server may send a request to the first electronic device. The request may ask the first user to join the group communication session. After the first user has joined the group communication session, the server may request access to a camera associated with the first electronic device. If the first user accepts the request, the first electronic device may activate the camera to provide a real-time image (e.g., video) of the first user to the one or more vouching users. The one or more vouching users may then use the real-time image (e.g., video) of the first user to confirm that the first user is who they purport to be. In some examples, the server may request permission to initiate the group communication session, for example, before initiating the group communication session. The first user may approve or deny the request to initialize the group communication session. Further, the server may start recording the group communication session. In some instances, the recording may be saved (stored), for example, in a memory associated with the server, a cloud environment and/or the like. The group communication session may be initiated through an interface on the first electronic device.

At step 1035, the server may send a group communication request to the one or more second electronic devices. The group communication request may be sent via an electronic communication, such as those described above. As will be discussed in greater detail below with respect to FIG. 13A, the group communication request may include options for the vouching user to accept or decline the request. By clicking accept, the one or more vouching users and/or the first user may be connected to the group communication session. By clicking decline, the one or more vouching users and/or the first user may not be connected to the group communication session. Additionally or alternatively, the group communication request may comprise a link to a website, a teleconference, a video call, a video conference, a livestream connection, a phone call, a chat room, a messaging application, a messaging service, and/or the like. By clicking the link, the one or more vouching users and/or the first user may be connected to the group communication session. Further, the group communication request may comprise a personal message from the first user to the one or more vouching users. The personal message may be in the form of a video message, an audio message, a written message, and/or the like. Additionally, the server may send, to the first electronic device, a list of vouching users who joined the group communication session.

At step 1040, the server may send, to the one or more second electronic devices and via the group communication session, a request to verify the first user's identity. The request may prompt (ask) the one or more vouching users whether the person claiming to be the first user in the video, livestream, phone call, conference, chat room, and/or the like, is actually the first user. The request may cause one or more prompts to be outputted during the group communication session. For example, the request may prompt the one or more vouching users to press one ("1") if the person is the first user and to press two ("2") if the person is not the first user. Alternatively, the request may cause voting options to be displayed during the group communication session. As will be discussed in greater detail below with respect to FIG. 13B, the voting options may request that the one or more vouching users confirm or deny the first user's identity. The server may cause the voting options to be displayed, during the group communication session, on electronic devices associated with each of the one or more vouching users. The voting options may be a yes option and a no option. Additionally, the voting options may comprise a cancel option.

At step 1045, the server may receive responses from each of the one or more second electronic devices. A first subset of the responses may indicate that a vouching user, of a respective second electronic device, verifies the identity of the first user. A second subset of the responses may indicate that a second vouching user, of a respective second electronic device, rejects (denies) the identity of the first user.

At step 1050, the server may determine whether a quantity (number) of received responses from the first subset satisfies a second threshold. That is, the server may determine whether a predetermined quantity of the one or more vouching users verified the identity of the first user. In some instances, the server may determine whether the quantity of responses were received within a predetermined amount of time. The predetermined amount of time may be selected by the server and/or the first user during an account setup process. The second threshold may be a predetermined number established by the server. Alternatively, the second threshold may be previously established by the first user, for example, during an account setup process. The second threshold may be one or greater.

In response to a determination that a predetermined quantity of the one or more vouching users verified the identity of the first user, the server may send, to the first electronic device, a request to update authentication credentials, in step 1055. At step 1060, the server may receive, from the first electronic device, updated authentication credentials. At step 1065, the server may grant access to the account. The first user may then access the account through the first electronic device.

In response to a determination that a predetermined quantity of the first subset of the one or more vouching users does not satisfy the second threshold, the server may determine whether responses were received from all of the one or more second electronic devices, in step 1070. If the server determines that one or more second electronic devices have not yet sent a response, the server may provide additional time to the one or more second electronic devices to provide their response. In some instances, the server may resend requests, as discussed above with respect to step 1040, to the one or more second electronic devices in the group communication session. Additionally or alternatively, the server may revert to step 1035 and send additional invitations to the group communication session to additional vouching users.

If the server determines that responses have been received from all of the second electronic devices, the server may deny access to the account, in step 1075. In some cases, the server may determine that a malicious actor is attempting to access the first user's account and send an alert to the first user. The alert may be an electronic communication as described above.

FIG. 11 illustrates an example method 1100 for verifying a first user's identity using one or more vouching users in accordance with one or more aspects of the disclosure. Method 1100 may be implemented by a suitable computing system, as described further herein. For example, method 1100 may be implemented by any suitable computing environment, by a computing device, and/or by a combination of computing devices, such as computing devices 101, 105, 107, and/or 109 of FIG. 1.

At step 1105, a first electronic device may send, to the server, a request to log into an account. The account may be an account such as the accounts described above; the server may send the request through a GUI as disclosed above.

Further, the first electronic device may send authentication credentials, such as the authentication credentials and associated protocols described above, along with the request to log into the account.

At step 1110, the first electronic device may receive an indication that access to the requested account is denied, through an electronic communication as described above. At step 1115, the first electronic device may send, to the server, an indication of one or more forgotten authentication credentials. Additionally, the indication of one or more forgotten authentication credentials may comprise a request to reset the one or more forgotten authentication credential.

At step 1120, the first electronic device may receive, from the server, recovery options. The recovery options may include verification of the first user's identity by one or more vouching users confirming the first user's identity. Additionally, the option to recover a forgotten password by one or more vouching users may include an option to choose one or more specific registered vouching users to whom to send a request to verify the first user's identity. The one or more vouching users may confirm the first user's identity in real time. Real time identity verification improves verification efficiency by saving time during the verification process and reducing identification errors. Reducing identification errors, in turn, improves account security and consumer confidence in ecommerce transactions. For example, by verifying the first user's identity immediately, the first user is not required to contact or travel to their merchant, financial institution, and/or the like to gain account access.

At step 1125, the first electronic device may send, to the server, one or more selected recovery options. For the purposes of this disclosure, the selection may indicate verification by one or more vouching users. The selection may indicate one or more vouching users to contact as part of the identity verification. Further, the first electronic device may send, to the server, a personal message, from the first user, to the vouching user. The personal message may be in the form of a video message, an audio message, a written message, and/or the like.

The first electronic device may receive, from the server, a request to join a group communication session through an interface on the first electronic device. At step 1130, the first electronic device may join the group communication session. The group communication session may comprise a medium such as those described above. After accepting the request to join the group communication session, the first electronic device may receive a further request from the server to access the first electronic device's camera. Upon accepting the request from the server to access the first electronic device's camera, the first electronic device may activate the camera to provide a real-time image (e.g., video) of the first user to the one or more vouching users, as described above.

For example, the group communication session may comprise a livestream of the first user, as described above. The livestream may be initiated through an interface on the first electronic device. The interface may access a camera associated with the first electronic device to initiate the livestream. Additionally, before initiating the livestream on the first electronic device, the server may first send a permission request to initiate the livestream on the first electronic device. Permission may be requested by an electronic communication, as described above. The permission request may comprise options for the first user to approve or deny the request to initialize a live feed.

At step 1135, after a verification of the first user's identity via the vouching users, the first electronic device may receive a request to update one or more forgotten authentication credentials. The request may be sent through an electronic communication, as described above. Further, the request may be sent through the interface. After the first electronic device sends updated authentication credentials at step 1140, the first electronic device may access the account at step 1145.

FIG. 12 describes a method 1200 of a second electronic device verifying a first user's identity in accordance with one or more aspects of the disclosure. Method 1200 may be implemented by a suitable computing system, as described further herein. For example, method 1200 may be implemented by any suitable computing environment by a computing device and/or combination of computing devices, such as computing devices 101, 105, 107, and 109 of FIG. 1.

Figure 13B:
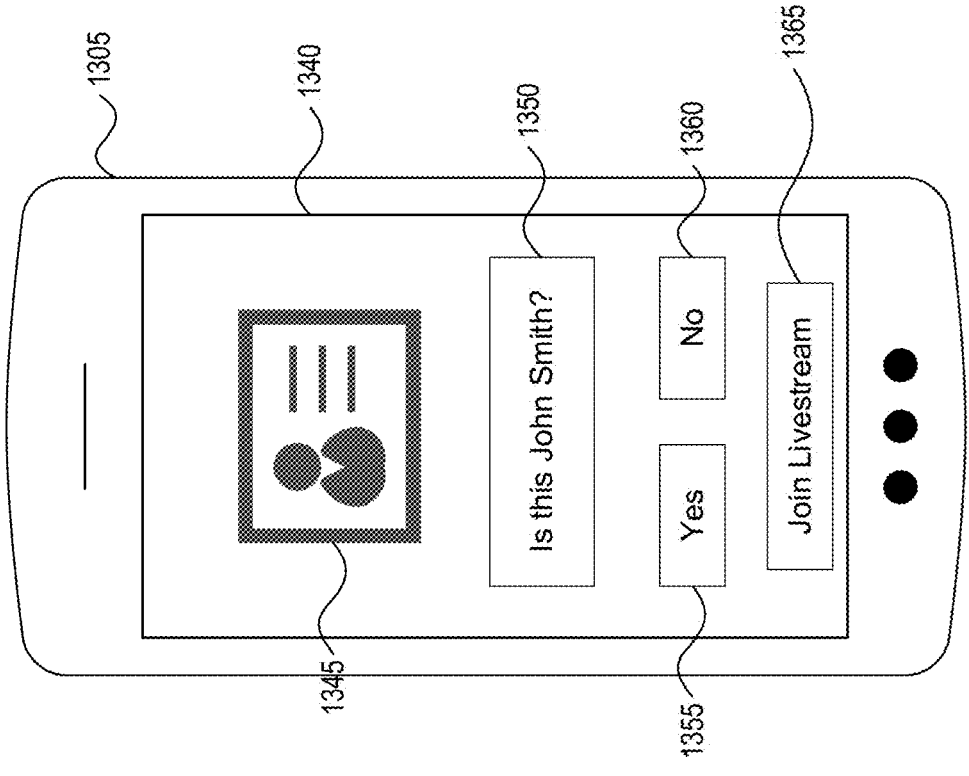
FIG. 13B is an example of an interface according to one or more aspects of the disclosure.
Figure 13A:
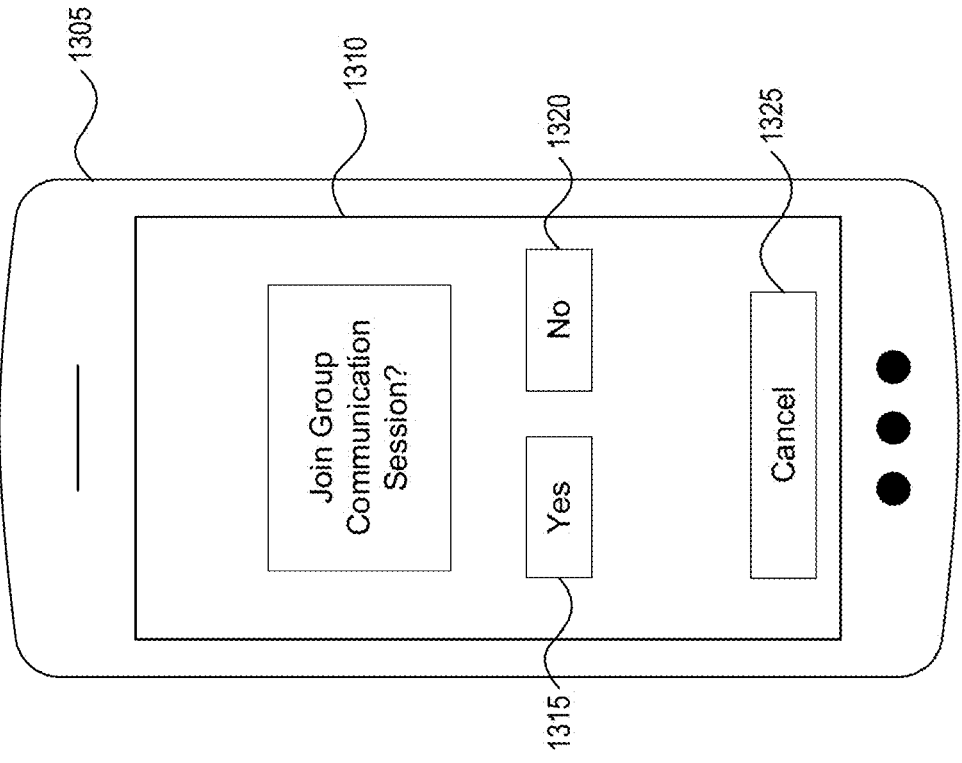
FIG. 13A is an example of an interface according to one or more aspects of the disclosure.

At step 1205, a second electronic device may receive a request to join a group communication session. The request may be received via an electronic communication as described above. As shown in FIG. 13A, the request to join a group communication session may be received via an interface 1310. Interface 1310 may be displayed on a second electronic device, such as electronic device 1305. Interface 1310 may provide a vouching user several options, such as accepting the request via "Yes" button 1315 or declining the offer via "No" button 1320. Interface 1310 may also comprise a "Cancel" button 1325, which may allow the vouching user to decline the request via cancellation.

Additionally or alternatively, the request may comprise a personal message from the first user to the vouching user. The personal message may be in the form of a video message, an audio message, a written message, and/or the like. Further, the request may provide a link to a website, a teleconference, a video call, a video conference, a livestream connection, a phone call, a chat room, a messaging application, a messaging service, and/or the like, connecting the vouching user to the group communication session.

At step 1210 in FIG. 12, the second electronic device may join the group communication session. The vouching user may join the group communication session automatically, for example, when accepting the group communication request via the "Yes" button 1315 in FIG. 13A. Alternatively, the second electronic device may join the group communication session by clicking on a link to a website, a teleconference, a video call, a video conference, a livestream connection, a phone call, a chat room, a messaging application, a messaging service, and/or the like, provided in the request. Further, the second electronic device may join the group communication session via the interface (e.g., interface 1310).

At step 1215 in FIG. 12, the second electronic device may receive, during the group communication session, a request to verify the identity of the first user. As shown in FIG. 13B, the request may be displayed via interface 1340 using prompt 1350. The vouching user may send a response, at step 1220, for example, using interface 1340, in FIG. 13B. Interface 1340 may comprise a real-time image, or video, 1345 of the first user, which the vouching user may use to confirm the first user's identity. Further, the interface 1340 may provide voting options to the vouching user, such as confirming the first user's identity via "Yes" button 1355 or denying the first user's identity via "No" button 1360. Further, the interface 1340 may allow the vouching user to join the group communication session by selecting the "Join" button 1365.

Although the disclosure recites employing different methods of verifying the first user's identity by vouching users during specific situations requiring user authentication (i.e., MFA process and forgotten passwords), it should be understood that such situations are meant to be illustrative and not limiting. For example, a first user may request a vouching user to provide an indication of proximity (e.g., a token) when forgetting one or more authentication credentials. Further, a first user may request vouching users to confirm their identification via a group communication session during an MFA process.

In addition to the benefits described above, the present disclosure may provide opportunities for government agencies, such as the Transportation Security Administration (TSA), Department of Motor Vehicles (DMV), etc., and other high security industries to comply with data protection regulations and increased privacy requirements while providing individuals extra flexibility during identification procedures. For example, when a user forgets their required government issued identification when checking in at an airport, the user may implement the above disclosed method and rely on trusted friends, family members, and/or coworkers to confirm their identity. Further, this method may be enacted during the voting season to confirm residency and/or citizenship, when purchasing alcohol to establish proof of age, for school or testing related activities requiring proof of identity, during a traffic stop, and/or the like.

Additionally or alternatively, the method may be implemented during account setup procedures for accounts such as bank accounts, credit cards, financial loans, and the like. For example, a financial institution may request a client to register vouching users when the client requests to open a credit line, bank account, and/or the like. The financial institution may verify the client's identity by one or more registered vouching users. Further, the financial institution may then assign each vouching user an internal trustworthiness score. The trustworthiness score may be based on credit scores, social scores, previous work history, educational achievements, volunteer efforts, and the like. The financial institution may weigh a vouching user's identity confirmation with the vouching user's internal trustworthiness score to increase identification confidence and accuracy.

Further, this method may be implemented to solicit one or more registered vouching users' feedback when analyzing a client's financial request. For example, a financial institution may request a client to register one or more vouching users when the client requests to open or change a credit line. The financial institution may request via email, text, push notification, mail, phone call, or the like that the vouching users verify the client's personal information. The client's personal information may include their address, income, work experience, birthday, and/or the like. Further, the financial institution may request the vouching users give their honest assessment of the client's creditworthiness, trustworthiness, and/or the like. The information gained from the vouching users may be weighed against the vouching user's assigned internal trustworthiness score, then used in a credit decision/risk model to approve or deny the credit line adjustment.

Additionally, implementing the above disclosed methods may allow family members to feel more secure and confident when their children begin establishing their online life. Parents and caregivers may help the child access their account using the above described methods in the case of a forgotten password, during an MFA process, and/or the like. Additionally, the collaborative nature of the disclosure may foster greater community engagement, present opportunities to deepen relationships, and provide increased trust in the digital consumer experience.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:

receiving, by a server from a first electronic device associated with a first user, a request to log into an account associated with the first user;

sending, by the server to the first electronic device, one or more secondary authentication options for the first user to select as a part of a multifactor authentication (MFA) process;

receiving, by the server from the first electronic device, a selection of a secondary authentication option of the one or more secondary authentication options, wherein the selection comprises an indication of a second user to verify an identity of the first user;

sending, by the server to a second electronic device associated with the second user, an electronic communication requesting that the second user verify the identity of the first user;

causing display, by the server on the second electronic device, of an option to verify the identity of the first user;

receiving, by the server from the second electronic device, an indication that the first user is within a predetermined distance of a location of the second electronic device, wherein the indication that the first user is within the predetermined distance comprises the second electronic device receiving a token associated with the first user; and granting, by the server and based on the indication that the first user is proximately located to the second electronic device, access to the account associated with the first user.

2. The method of claim 1, further comprising:

receiving, by the server from the first electronic device, a request to register the second user as a vouching user for the first user, wherein the vouching user verifies an identity of the first user during an MFA process;

causing display, by the server and on the second electronic device, of an option for the second user to confirm registration as a vouching user for the first user; and registering, by the server and based on a confirmation that the second user agrees to verify the identity of the first user during an MFA process, the second user as a vouching user for the first user.

3. The method of claim 1, wherein the token associated with the first user comprises a transaction card of the first user.

4. The method of claim 1, wherein the second electronic device receives the token via a short-range wireless protocol.

5. The method of claim 4, wherein the short-range wireless protocol comprises a Near Field Communications (NFC) protocol.

6. The method of claim 1, wherein the second electronic device receiving the token associated with the first user comprises the first user tapping a smart card to the second electronic device, wherein the smart card comprises at least one of a credit card, a debit card, a transaction card, or personal identification documentation.

7. The method of claim 1, wherein the second electronic device receiving the token associated with the first user comprises the second electronic device capturing an image of a personal identification document associated with the first user.

8. The method of claim 1, wherein the electronic communication comprises at least one of:

a text message;

an email;

a push notification; or a phone call.

9. A method comprising:

sending, by a first electronic device associated with a first user to a server, a request to log into an account associated with the first user;

receiving, by the first electronic device from the server, one or more secondary authentication options for the first user to select during a multifactor authentication (MFA) process;

sending, by the first electronic device to the server, a selection of the one or more secondary authentication options, wherein the selection comprises an indication of a second user to verify an identity of the first user; and accessing, by the first electronic device from the server and based on a determination that the first user is within a predetermined distance of a location of a second electronic device associated with the second user, the account associated with the first user.

10. The method of claim 9, further comprising:

sending, by the first electronic device to the server, a selection of secondary users to register as vouching users, wherein the vouching user verifies an identity of a first user during the MFA process.

11. The method of claim 9, further comprising:

receiving, by the second electronic device, a token associated with the first user, wherein receiving the token comprises receiving the token via a short-range wireless protocol.

12. The method of claim 11, wherein the short-range wireless protocol comprises a Near Field Communications (NFC) protocol.

13. The method of claim 9, wherein the second electronic device receiving the token associated with the first user comprises the first user first tapping a smart card to the second electronic device, wherein the smart card comprises at least one of a credit card, a debit card, a transaction card, or personal identification documentation.

14. The method of claim 9, wherein the second electronic device receiving the token associated with the first user comprises the second electronic device capturing an image of a personal identification document associated with the first user.

15. A method, comprising:

receiving, by a second electronic device from a server, a request to register a second user as a vouching user for a first user, wherein the vouching user verifies an identity of the first user during a multifactor authentication (MFA) process;

sending, by the second electronic device to the server, a confirmation that the second user agrees to be a vouching user for the first user;

receiving, by the second electronic device from a server, an electronic communication requesting that the second user verify the identity of the first user;

displaying, by the second electronic device from the server and in response to the electronic communication requesting that the second user verify the identity of the user, an option to verify the identity of the first user;

receiving, by the second electronic device and in response to displaying the option to verify the identity of the first user, an input verifying the identity of the first user; and sending, by the second electronic device to the server and based on the input, verification of the identity of the first user.

16. The method of claim 15, further comprising receiving the input verifying the identity of the first user via a short-range wireless protocol.

17. The method of claim 16, wherein the short-range wireless protocol comprises a Near Field Communications (NFC) protocol.

18. The method of claim 15, further comprising receiving the input verifying the identity of the first user by tapping a smart card associated with the first user to the second electronic device, wherein the smart card comprises at least one of a credit card, a debit card, a transaction card, or personal identification documentation.

19. The method of claim 15, further comprising capturing an image of a personal identification document associated with the first user as part of receiving the input verifying the identity of the first user.

20. The method of claim 15, further comprising receiving the input verifying the identity of the first user by tapping the first electronic device to the second electronic device.

* * * * *